US012578448B2

(12) United States Patent
Lehner et al.

(10) Patent No.: US 12,578,448 B2
(45) Date of Patent: Mar. 17, 2026

(54) METHOD FOR PROBING A SUBSURFACE STRUCTURE

(71) Applicant: PROCEQ SA, Schwerzenbach (CH)

(72) Inventors: Samuel Lehner, Zürich (CH); Antonio Caballero, Volketswil (CH)

(73) Assignee: PROCEQ SA, Schwerzenbach (CH)

( * ) Notice: Subject to any disclaimer, the term of this patent is extended or adjusted under 35 U.S.C. 154(b) by 496 days.

(21) Appl. No.: 18/015,838

(22) PCT Filed: Jul. 17, 2020

(86) PCT No.: PCT/EP2020/070361
§ 371 (c)(1),
(2) Date: Jan. 12, 2023

(87) PCT Pub. No.: WO2022/012760
PCT Pub. Date: Jan. 20, 2022

(65) Prior Publication Data
US 2023/0266453 A1     Aug. 24, 2023

(51) Int. Cl.
G01S 13/38 (2006.01)
G01S 7/40 (2006.01)
G01S 13/02 (2006.01)

(52) U.S. Cl.
CPC ................ G01S 13/38 (2013.01); G01S 7/40 (2013.01); G01S 13/0209 (2013.01)

(58) Field of Classification Search
CPC ......... G01S 13/38; G01S 7/40; G01S 13/0209
See application file for complete search history.

(56) References Cited

U.S. PATENT DOCUMENTS

2003/0154030 A1     8/2003     Harley
2011/0193739 A1     8/2011     Strauch et al.
(Continued)

FOREIGN PATENT DOCUMENTS

CN     102662195     9/2012
CN     104735017     6/2015
(Continued)

OTHER PUBLICATIONS

Zhang Yu et al: "Compressive orthogonal frequency division multiplexing waveform based ground penetrating radar", 2015 IEEE Radar Conference (RADARCON), IEEE, May 10, 2015 (May 10, 2015), pp. 684-689 (Year: 2015).*
(Continued)

*Primary Examiner* — Marcus E Windrich
(74) *Attorney, Agent, or Firm* — GREENBLUM & BERNSTEIN, P.L.C.

(57) ABSTRACT

A method and a device for probing a subsurface structure. The method includes sending an electromagnetic wave into the structure, receiving an echo of the electromagnetic wave from the structure and processing the echo for deriving an internal feature of the structure. The sending the electromagnetic wave into the structure includes subsequently sending a plurality of electromagnetic probe signals with differing frequency spectra into the structure. Each probe signal includes at least two non-zero spectral components. The receiving the echo includes receiving an echo signal for each probe signal. The processing the echo includes determining at least one amplitude and phase for each echo signal.

28 Claims, 2 Drawing Sheets

(56)          References Cited

U.S. PATENT DOCUMENTS

| | | | | |
|---|---|---|---|---|
| 2012/0133543 | A1* | 5/2012 | Al-Khalefah | G01S 7/292 |
| | | | | 342/22 |
| 2014/0197983 | A1 | 7/2014 | Reuter | |
| 2014/0316261 | A1 | 10/2014 | Lux et al. | |
| 2015/0355320 | A1* | 12/2015 | Kim | G01S 13/0209 |
| | | | | 342/21 |
| 2020/0072813 | A1 | 3/2020 | Lehner et al. | |
| 2020/0175959 | A1* | 6/2020 | Cardinaux | G10K 15/02 |
| 2020/0400805 | A1* | 12/2020 | Sarabandi | G01S 13/0209 |
| 2024/0241247 | A1* | 7/2024 | Poser | G05D 1/648 |

FOREIGN PATENT DOCUMENTS

| | | |
|---|---|---|
| CN | 104931962 | 9/2015 |
| CN | 110383063 | 10/2019 |
| JP | 2014-514567 | 6/2014 |
| JP | 2016-521363 | 7/2016 |
| KR | 10-2013-0065910 | 6/2013 |
| KR | 10-2016-0043756 | 4/2016 |
| KR | 10-2017-0062024 | 6/2017 |
| WO | 2018/161183 | 9/2018 |

OTHER PUBLICATIONS

Costanzo et al., "Multiband software defined radar for soil discontinuities detection", Journal of Electrical and Computer Engineering, vol. 2013, No. Article ID 379832, XP009525948, ISSN: 2090-0147, DOI: 10.1155/2013/379832, retrieved from the Internet: URL:https:// doi.org/10.1155/2013/ 3798327nosfx=y, pp. 1-6, (Aug. 13, 2013).

Raghavendra et al., "A novel approach to generate OFDM radar signals", 2016 International Conference on Electrical, Electronics, Communication, Computer and Optimization Techniques (ICEEC-COT), IEEE, XP033107639, DOI: 10.1109/ ICEECCOT.2016. 7955203 [retrieved on Jun. 22, 2017], pp. 141-145, (Dec. 9, 2016).

Bai Hao et al., "Effects of GPR antenna configuration on subpavement drain detection based on the frequency-shift phenomenon", Journal of Applied Geophysics, vol. 146, XP085271300, ISSN: 0926-9851, DOI: 10.1016/J.JAPPGE0.2017.09.019, pp. 198-207, (Oct. 1, 2017).

Qiwei Zhang et al., "A novel OFDM based ground penetrating radar", Ground Penetrating Radar ( GPR), 2010 13th International Conference On, IEEE, Piscataway, NJ, USA, XP031733899, ISBN: 978-1-4244-4604-9, pp. 1-6, (Jun. 21, 2010).

Zhang Yu et al., "Compressive orthogonal frequency division multiplexing waveform based ground penetrating radar," 2015 IEEE Radar Conference (RADARCON), IEEE, XP032788540, DOI: 10.1109/RADAR.2015.7131083, [retrieved Jun. 22, 2015], pp. 684-689, (May 10, 2015).

Int'l Search Report (Form PCT/ISA/210) conducted in Int'l Appln. No. PCT/EP2020/070361 (Mar. 12, 2021).

Int'l Written Opinion (Form PCT/ISA/237) conducted in Int'l Appln. No. PCT/EP2020/070361 (Mar. 12, 2021).

China Office Action conducted in counterpart China Appln. No. 20208014729.7 (Sep. 12, 2024).

Zhang et al., "OFDM and compressive sensing based GPR imaging using SAR focusing algorithm," Apr. 1, 2015, vol. 9437, Apr. 1, 2015, pp. 943727-943725, XP060052539, DOI: 10.1117/12. 2083857.

Xia et al., "Low cost time efficient multi-tone test signal generation using OFDM technique," Dec. 31, 2013, XP093242780, DOI: 10.1007/s10836-013-5414-8.

Europe Office Action conducted in counterpart Europe Appln. No. 20743659.3 (Jan. 31, 20125).

Korea Office Action conducted in counterpart Korea Appln. No. 10-2023-7001925 (Jan. 15, 2025).

Japan Office Action conducted in counterpart Japan Appln. No. 2023-502912 (Feb. 6, 2024).

* cited by examiner

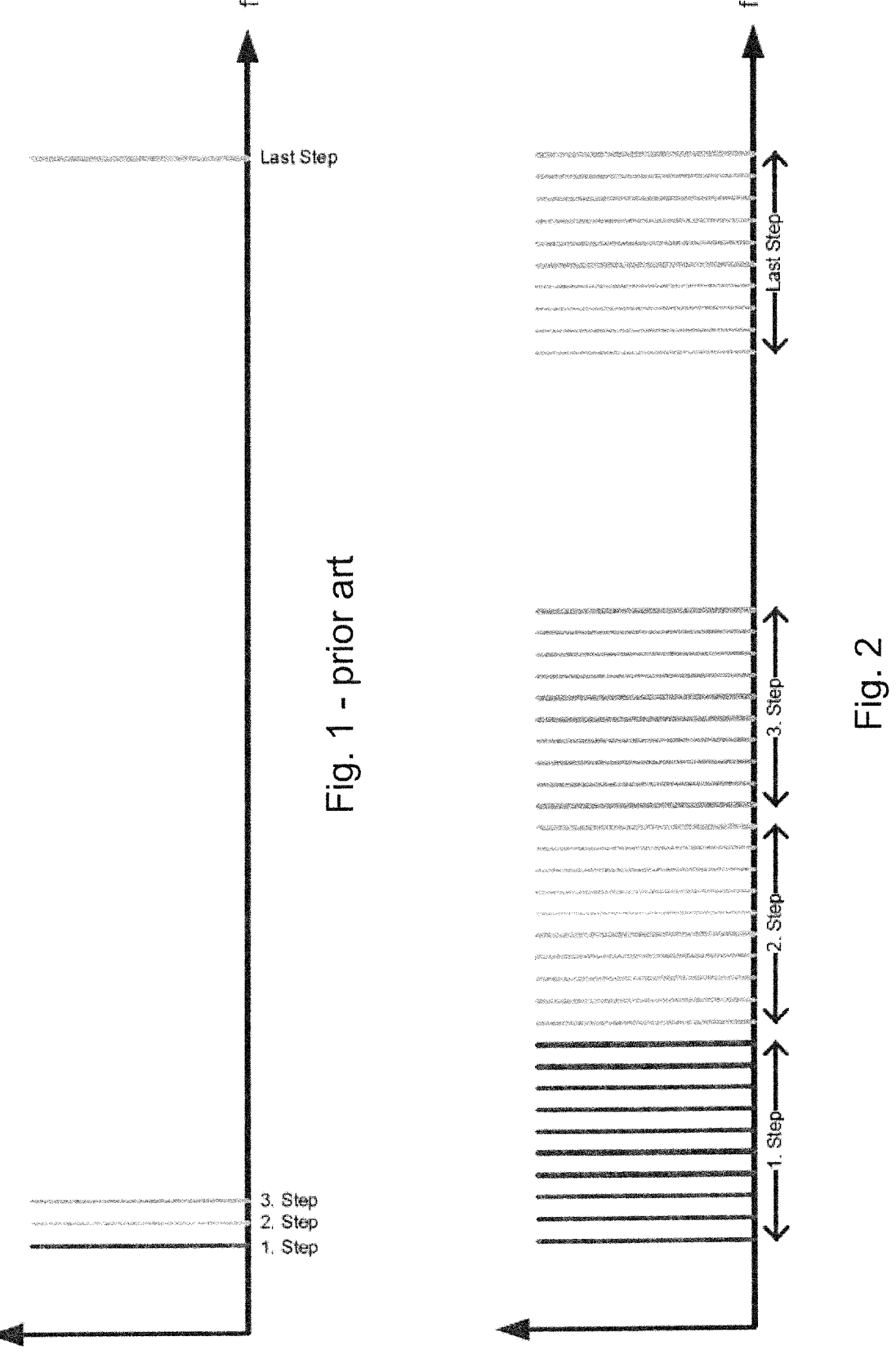

METHOD FOR PROBING A SUBSURFACE STRUCTURE

TECHNICAL FIELD

The invention relates to a method and a device for probing a subsurface structure using electromagnetic waves.

BACKGROUND ART

Electromagnetic waves are routinely used for probing a subsurface structure such as a man-made structure or the underground. Ground penetrating radar (GPR) is a technique often applied in geophysical surveys or in nondestructive testing, e.g. of concrete structures, which employs electromagnetic waves, usually in the range from 10 MHz to 2.6 GHz.

A known method for GPR data acquisition is stepped-frequency continuous wave (SFCW). Instead of sending single broadband pulses, SFCW uses continuous-wave probe signals of a certain frequency which is changed over time or between subsequent probe signals. An example of such method and a suitable device is described in WO 2018/161183 A1.

SFCW methods are advantageous in terms of data quality and thus quality of the resulting image of the subsurface structure, in particular in terms of signal-to-noise ratio (SNR) and resolution. On the other hand, the acquisition speed of such methods is limited, meaning that GPR measurements of a defined resolution, e.g. 2 cm, may only be obtained if the GPR device does not move faster relative to the subsurface than a maximum acquisition speed which conventionally is of the order of e.g. 10 to 20 km/h.

DISCLOSURE OF THE INVENTION

Hence, it is a general object of the invention to provide a method and a device for probing a subsurface structure allowing faster data acquisition and in particular a higher acquisition speed of the device for probing the subsurface structure, while maintaining a high resolution of acquired data.

The features described below with regard to the method are meant to also pertain to the device and vice versa. Further, described features are meant to be disclosed independently from each other and in combination where reasonable.

Method for Probing a Subsurface Structure

In order to implement the above and still further objects of the invention, which will become more readily apparent in the following description, the method for probing the subsurface structure, e.g. a man-made structure or the underground, comprises the following steps:

sending an electromagnetic wave into the structure: The electromagnetic wave may be polarized, e.g. linearly polarized. The step of sending the electromagnetic wave into the structure is in particular performed by means of an antenna.

receiving an echo of the electromagnetic wave from the structure: Advantageously, a part of the wave sent into the structure is reflected by an internal feature of the structure, which features are characterized by a change of electrical properties, e.g. a change of a permittivity.

The reflected part of the wave may be received as the echo, i.e. a reflected electromagnetic wave, from the structure.

processing the echo for deriving an internal feature of the structure: The internal feature may e.g. be a location and/or gradient of an internal boundary within the structure, a characterization of a scatterer or reflector, an amount of change of an electrical property, e.g. of a permittivity, at a certain location in the structure, etc.

The step of sending the electromagnetic wave into the structure comprises subsequently sending a plurality of electromagnetic probe signals with differing frequency spectra into the structure. In particular, the frequency spectrum of a probe signal is given by its Fourier transform. Each probe signal comprises at least two non-zero spectral components. In particular, this is a difference to conventional SFCW, wherein each probe signal has only one spectral component, meaning that only one frequency is sent at a time.

In an embodiment, each probe signal comprises more than two non-zero spectral components, in particular between 3 and 20, in particular between 5 and 15, in particular 10, non-zero spectral components. In an extreme case, each probe signal may comprise noise, e.g. white noise, over a defined frequency spectrum, with said frequency spectrum having advantageously a width of at least 1000 MHz.

The step of receiving the echo comprises receiving an echo signal for each probe signal. In particular, the echo signals are received subsequently.

The step of processing the echo comprises determining at least one amplitude and phase for each echo signal, advantageously one echo and phase for a plurality of spectral components in particular for each non-zero spectral component.

The method of probing a subsurface structure as described has the advantage that a number of spectral components, in particular at least two, are sent into the structure concurrently, i.e. at the same time. In comparison to conventional SFCW, such method may lead to a speed-up of data acquisition by a factor equal to the number of spectral components in each probe signal. This means that a respective device for probing the subsurface structure may move with a higher speed, in particular higher by a factor equal to the number of spectral components in each probe signal, while maintaining the same resolution. This in turn facilitates to mount the device e.g. on a car or on an airborne drone and performing data acquisition over large areas and/or inaccessible locations.

On the other hand, the method as described also poses challenges and has further advantages, which will be described in view of the following advantageous embodiments.

Orthogonal Spectral Components

In an advantageous embodiment, the spectral components are concurrent subcarrier signals with differing subcarrier frequencies. In particular, the spectral components are located in non-overlapping frequency bands. In telecommunications, a similar method is known as frequency-division multiplexing (FDM) in a completely different context. The non-overlapping frequency bands allow to cover a broad spectral range even with a low-power emitter.

In a further advantageous embodiment, the at least two spectral components are orthogonal to each other. "Orthogonal" in particular means that they fulfill an orthogonality condition, typically defined as their inner product, or equivalently an integral of their product over a time interval, being zero. In particular, a first subcarrier signal f(t) and a second subcarrier signal g(t) are said to be "orthogonal" in the present context if the time integral of their product ∫f(t)g(t)dt is smaller than a finite threshold, e.g. much smaller than √[∫f(t)f(t)dt·∫g(t)g(t)dt], in particular smaller than 10% of this expression. In particular, the time integral is calculated over a time interval representing the periodicity of f(t) and/or g(t). An example for orthogonal subcarrier signals are functions of the form sin (mx) and sin (nx), wherein m and n are unequal positive integers. In telecommunications, a similar application is known as orthogonal frequency-division multiplexing (OFDM).

In particular, neighboring subcarrier frequencies differ from each other by a subcarrier spacing, which may be a regular subcarrier spacing, i.e. the same for all pairs of neighboring subcarrier frequencies. Advantageously, the subcarrier spacing fulfills an orthogonality condition, e.g. in that the subcarrier frequencies are integer multiples of the subcarrier spacing. In particular, the subcarrier spacing may be between 1 and 10 MHz, in particular approximately 4 MHz.

In an embodiment, the frequency spectra of the probe signals are located between 10 and 8000 MHz, in particular between 40 and 3440 MHz. Advantageously, an overall frequency spectrum of the plurality of subsequently sent probe signals has a width of at least 500 MHz, in particular at least 1000 MHz, more particular at least 2000 MHz. With such overall frequency spectrum, the method is able to reach a high resolution, e.g. of 2 cm or less, while at the same time reaching a large penetration depth, e.g. of 5 m or more, depending on the electrical properties of the subsurface structure.

Non-Zero Initial Phase Shift

Now, sending a probe signal comprising a plurality of orthogonal subcarrier signals without further measures may lead to a high peak transmitting power. This is due to the fact that, at certain times, peaks of orthogonal functions with zero initial phase shift will add up constructively and thus generate a high cumulative signal. The "initial phase shift" may be defined as phase difference between a zero-phase of the lower-frequency function and a closest zero-phase of the higher-frequency function. In the device for probing the subsurface structure, the frontend, i.e. the antenna plus analog components for processing the received signal, as well as a probe signal generator for generating the probe signals and an echo signal processor for processing the echo signals have to be adapted to handle the peak transmitting power. For reasons of signal-to-noise ratio and low intermodulation, it is thus undesired to have a high peak transmitting power which is much larger than an average transmitting power.

Therefore, in an advantageous embodiment, at least two of the spectral components have a non-zero initial phase shift. In particular, the initial phase shift of the at least two spectral components is such that a maximum amplitude of the probe signal is smaller than a maximum amplitude of a hypothetic probe signal with the same spectral components but zero initial phase shift of the spectral components, in particular smaller by at least 10%, at least 25% or at least 50%. This allows to keep the peak transmitting power low, in particular not much larger, e.g. only a factor of 2 or 3, than the average transmitting power. Thus, a good signal-to-noise ratio and a low intermodulation may be achieved.

In practice, initial phase shifts fulfilling the above condition for a given number of subcarrier signals may be obtained by an empirical approach, e.g. in a numerical simulation: The subcarrier signals are added up with random initial phase shifts, thus generating a test probe signal. Then a ratio of maximum of the test probe signal to an average of the test probe signal is derived. These two steps are iterated with different random initial phase shifts, thus forming a set of test probe signals. For the actual application in probing the subsurface structure, the test probe signal with the smallest ratio is chosen. In this approach, the initial phase shifts may be derived from a random number generator, but then, they are not changed in the application. In particular, the initial phase shift of the at least two spectral components may be constant, i.e. the same, for each probe signal.

Generating the Probe Signals

In an advantageous embodiment, the method additionally comprises the step of generating the probe signals by frequency translating at least two modulation signals of differing modulation frequencies with at least one carrier signal. In particular, the step of generating the probe signal includes changing a carrier frequency of the carrier signal between subsequent probe signals. In this way, the modulation frequencies may be the same for all probe signals.

Advantageously, the steps of generating the probe signals and/or processing the echo signals are partly performed in digital domain and partly in analog domain, thereby exploiting benefits both domains, e.g. a precise control on the signals with existing digital data processing routines and a simplicity and speed of analog components. In an embodiment, the step of generating the probe signals comprises generating at least two digital modulation signals. Also, the step of generating the probe signals may comprise generating at least one analog carrier signal. According to the above description, the at least two of the digital modulation signals advantageously have a non-zero initial phase shift.

Typical modulation frequencies are below 100 MHz, in particular in a range between 40 and 80 MHz. Advantageously, the modulation frequencies differ by the subcarrier spacing. Further, a carrier frequency of the carrier signal may be at least 100 MHz.

In an embodiment, the step of generating the probe signals comprises obtaining at least two analog modulation signals by digital-to-analog converting the at least two digital modulation signals, and mixing the at least two analog modulation signals with at least one mixing signal from at least one analog oscillator by means of at least one analog mixer. Further, the step of generating the probe signals may comprise sequentially mixing the analog modulation signals with mixing signals from a plurality of analog oscillators by means of a plurality of analog mixers.

Advantageously, the step of generating the probe signals comprises applying upconversion to the analog modulation signals, and in particular upconversion and subsequent downconversion. Direct upconversion typically requires an image rejection mixer which brings about some limitations, such as limited image suppression, local oscillator (LO) leakage and complex filter stages. Upconverting the signal first allows to attenuate the image and LO leakage by a filter. Since the LO in the downconversion stage is always higher than the wanted output signal the leakage of the LO can be neglected. In this way, complex filter stages may be avoided.

In a further embodiment, the step of generating the digital modulation signals comprises switching off defined modulation signals. This may be performed still in the digital domain, e.g. by applying a switching stage. Switching off defined modulation signals changes the number of modulation frequencies in the corresponding probe signal. This, in turn, changes the peak voltage. A dynamic correction may then be applied to the modulation signals in order to keep the peak voltage constant, in particular on an intended level.

Further, it may be useful that a first of the probe signals comprises a different number of non-zero spectral components than a second of the probe signals. For instance, a higher-frequency probe signal may contain less, e.g. half of the, spectral components than a lower-frequency probe signal. In this case, the subcarrier spacing of the higher-frequency probe signal may be larger than, e.g. double, the subcarrier spacing of the lower-frequency probe signal. This is in particular reasonable in order to minimize data that needs to be processed and eventually stored and transmitted. By enlarging the subcarrier spacing in higher-frequency probe signals, not much is lost in terms of penetration depth, while a smaller subcarrier spacing at lower-frequency probe signals may be required for a high penetration depth. Again, deleting specific subcarrier signals may be performed on the respective modulation signals still in the digital domain.

In an embodiment, an overall duration of each probe signal does not exceed 2 μs. Such short duration of each probe signal prevents that too much electromagnetic wave energy is sent into the environment, potentially degrading telecommunication signals or affecting living beings.

Further, an envelope to each probe signal may have a rise time and a fall time, both of non-zero duration, in particular both larger than 0.5 μs and/or both larger than 10% of the duration of each probe signal. In comparison to a "hard window", in particular consisting of two step functions, such "smooth" probe signal has the advantage of avoiding ringing effects in the step of processing the echo. For that reason, the envelope may in particular be shaped as a Gaussian function or other known smooth window functions.

Processing the Echo Signals

Similarly to the step of generating the probe signals, also the step of processing the echo signals advantageously is performed partly in the analog domain and partly in the digital domain, thus combining the benefits of both as described above.

In an embodiment, the step of processing the echo signal comprises obtaining a mixed echo signal by mixing the echo signal with the at least one mixing signal from the at least one analog oscillator by means of at least one analog mixer. In particular, the step of processing the echo signal may comprise sequentially mixing the echo signal with the mixing signals from the plurality of analog oscillators by means of a plurality of analog mixers. It may be useful that the step of processing the echo signal comprises applying downconversion to the echo signal, in particular upconversion and subsequent downconversion.

Further, the step of processing the echo signal may comprise analog-to-digital converting the mixed echo signal to a digital echo signal.

In analogy to the above, the step of processing the echo signal advantageously comprises correcting the digital echo signal for the initial phase shift of the at least two spectral components. In particular, the initial phase shifts are known for each probe signal and thus for each corresponding echo signal, and may hence be corrected.

Also, it may be desired that the step of processing the echo signal comprises obtaining a serialized echo signal by serializing the at least two non-zero spectral components, in particular using the digital echo signal. "Serializing" in particular means that the non-zero spectral components in the echo signal, e.g. the modulation signals retrieved from the echo signal, are stringed together, one after the other, in time. In this way, the serialized echo signal resembles a signal acquired by conventional SFCW method. This enables the use of known data processing methods for further processing, e.g. to assemble and process A-scans or to apply a migration algorithm.

Eventually, the step of processing the echo may comprise deriving at least one property of the subsurface structure from a difference in amplitude and/or a difference in phase between the echo signal and the probe signal. The difference in amplitude and/or the difference in phase is directly related to, and in particular caused by the material properties, in particular electrical properties, and material distribution encountered by the electromagnetic wave on its travel path from the antenna into the structure and back.

Device for Probing the Subsurface Structure

A second aspect of the invention relates to a device for probing a subsurface structure. The device is configured to carry out the above-described method and comprises:

an antenna: In one embodiment, the same antenna may be used for sending the probe signals as well as receiving the echo signals. In another embodiment, the antenna may comprise a first antenna configured to send the probe signals into the subsurface structure, and a second antenna configured to receive the echo signals received from the subsurface structure. In both embodiments, the antenna or, respectively, the first antenna and the second antenna comprise a lower-frequency sub-antenna, e.g. with a center frequency of 350 MHz, and a higher-frequency subantenna, e.g. with a center frequency of 1500 MHz. Such subantennas have the advantage of transmitting and receiving probe signals and, respectively, echo signals more effectively at higher and lower frequencies, in particular around their center frequencies.

a probe signal generator for generating the electromagnetic probe signals to be sent into the subsurface structure by the antenna: In an advantageous embodiment, the probe signal generator comprises a digital signal generator configured to generate at least two digital modulation signals, a digital-to-analog converter configured to convert the digital modulations signals to analog modulation signals, at least one analog signal generator configured to generate at least one carrier signal, and at least one analog mixer configured to generate the probe signal by mixing the at least two analog modulation signals with the at least one carrier signal.

an echo signal processor for processing the echo signals received from the subsurface structure by the antenna: In an advantageous embodiment, the echo signal processor comprises at least one further analog mixer configured to generate a mixed echo signal by mixing the echo signal with the at least one carrier signal from the at least one analog signal generator, an analog-to-digital converter configured to convert the mixed echo signal to a digital echo signal, and a digital processor configured to derive the at least two non-zero spectral components from the digital echo signal.

a control unit for controlling the probe signal generator and the echo signal processor: In particular, the control unit is adapted to carry out the steps of the method of the present technology.

optionally a communication module, e.g. a WiFi module configured to transmit processed echo signals to a remote computing unit or display unit.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 shows a schematic frequency spectrum with spectral components of subsequently-sent probe signals according to a method of the prior art;

FIG. 2 shows a schematic frequency spectrum with spectral components of subsequently-sent probe signals in a method according to an embodiment of the invention;

MODES FOR CARRYING OUT THE INVENTION

Prior Art Example

Figure 3:
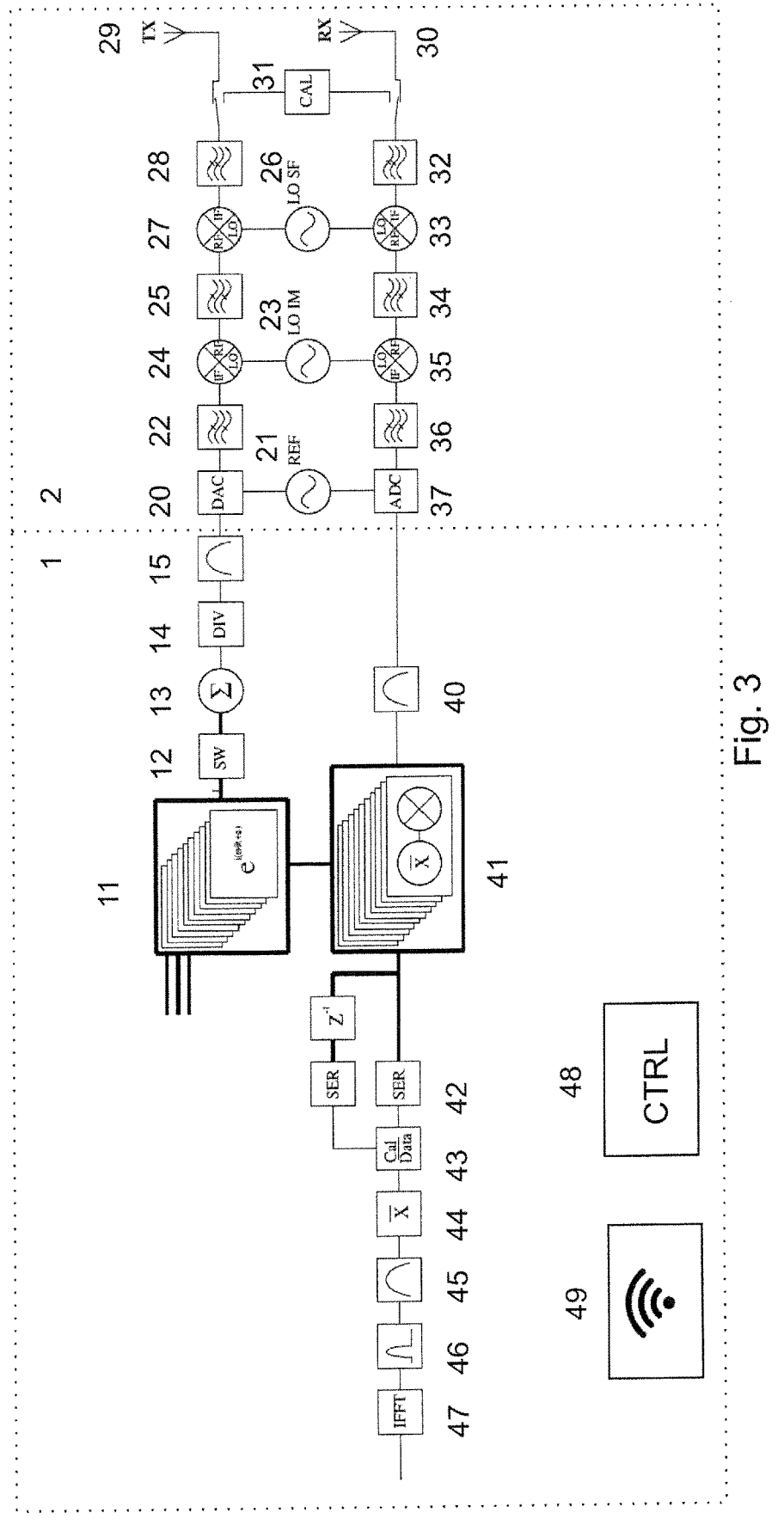
FIG. 3 shows a block circuit diagram of a device for probing the subsurface structure according to an embodiment of the invention.

In traditional SFCW GPR, a plurality of probe signals is sequentially sent into the subsurface structure, one after the other. Each probe signal conventionally consists of one spectral component only, meaning that each probe signal has and one single frequency, e.g. a single sine signal of a certain duration. This is depicted in FIG. 1 which shows a schematic overall frequency spectrum of all probe signals: In the 1st step, a first low-frequency probe signal with e.g. 30 MHz is sent into the subsurface structure. After that, a second probe signal is sent with a slightly higher frequency, e.g. 34 MHz, in the 2nd step. These steps of sending probe signals with increasing frequency is repeated until the last step, wherein a high-frequency probe signal with e.g. 4030 MHz is sent. All probe signals together form a sweep spanning an overall bandwidth, for instance between 30 and 4030 MHz in the present example. Employing low frequencies and high frequencies improves a resulting image of the subsurface structure in terms of penetration depth, i.e. the depth down to which the structure can be probed, and, respectively, resolution, i.e. the size of the smallest feature that can be resolved.

For a correct data acquisition and imaging, it is required that the whole sweep is sent into the subsurface structure and its echo is received while the antenna has not moved farther than the resolution. Evidently, this condition sets an upper limit to the acquisition speed, i.e. the speed with which the antenna moves relative to the subsurface structure.

In the above example, a number of 1000 steps is necessary to cover the overall bandwidth of 4000 MHz of the sweep with a frequency step of 4 MHZ. Assuming that each probe signal has a duration, also called dwell time, of 2 µs and that there is a break of a duration, also called lock time, of 5 µs, the total time required for the whole sweep is 7000 µs. With a desired resolution of e.g. 20 mm, the antenna may not move faster than approximately 10 km/h, in particular walking speed.

On the other hand, acquisition may nowadays conveniently be performed mounting the antenna on a car or a drone. In that case, an acquisition speed of the order of 100 km/h may be desired. Such speed is higher by a factor of 10 than the speed reachable with the prior art method. In other words, the total time for one sweep would need to be lower by a factor of 10, while maintaining the other parameters, in particular resolution, penetration depth, dwell time and lock time, fixed.

Example Method

The problem of limited acquisition speed is solved by a method according to an embodiment of the invention, which is shown in the schematic frequency spectrum of FIG. 2. Again, one probe signal is sent per step, sequentially from the 1st step to the last step. Now, however, each probe signal comprises a plurality of, for instance at least 10, spectral components. The frequency step between neighboring spectral components is again fixed, for instance to 4 MHz, in order to maintain the same penetration depth and resolution as above. By sending 10 spectral components at a time, i.e. within the same probe signal, the total time of a sweep decreases by a factor of 10. Thus, the maximum acquisition speed for a given resolution increases by a factor of 10. In the above example, the maximum acquisition speed is now approximately 100 km/h, which is well suited for large are surveys, e.g. by cars or drones.

In general, concurrently sending a number of spectral components, also called subcarrier signals, in each probe signal increases the maximum acquisition speed by a factor that is equal to the number of spectral components. In order that such concurrent sending of subcarrier signals eventually leads to data or an image of the structure which are comparable to traditional SFCW, e.g. in terms of signal-to-noise ratio and low intermodulation, the subcarrier signals fulfill certain conditions. These conditions are described above in section "Orthogonal spectral components" and "Non-zero initial phase shift".

Example Device

FIG. 3 shows a block circuit diagram of an example device for probing the subsurface structure. The device is configured to carry out a method according to an embodiment of the invention. Thus, in the following, aspects relating to the device as well as to the method are described.

The device comprises a digital processing unit 1 and an analog processing unit 2. In the digital processing unit 1, a plurality of modulation signals, e.g. ten modulation signals, is generated and processed by means of digital components 11 to 15, which are detailed below. In digital-to-analog converter (DAC) 20 with clock source 21, the digital modulation signals are converted to analog domain, and then further processed by analog components 22 to 28. In particular, the probe signal comprising a plurality of, e.g. 10, subcarrier signals is generated by mixing, or in other words frequency translating, the modulation signals with different carrier signals from analog oscillators 23 and 26. The probe signal is then sent into the subsurface structure by means of transmitting antenna 29. The components 11 to 28 may be subsumed as probe signal generator.

An echo signal is received back from the subsurface structure by means of receiving antenna 30. In general, receiving antenna 30 and transmitting antenna 29 may coincide, e.g. in a monostatic radar. The echo signal is processed with analog components 32 to 36. In particular, the echo signal is again mixed, or in other words frequency translated, with the different carrier signals from analog oscillators 23 and 26. The frequency translated echo signal is converted to digital domain by analog-to-digital converter (ADC) 37. Then, the echo signal is further processed by analog components 40 to 47. The components 32 to 47 may be subsumed as echo signal processor.

The device further comprises a control unit 48 configured to control the probe signal generator and the echo signal processor. Advantageously, the device also comprises a communication unit 49, e.g. a WiFi module. The communication unit 49 is configured to transmit the processed echo signal to a remote computing device or a display device. Transmittal of the processed echo signal may be performed with the output signal of any of components 43 to 47, in particular of component 44, implying that the further processing steps are performed by the remote computing device. Additionally, the communication unit 49 may also be configured to receive a control command from a remote computing device, e.g. for starting or ending a data acquisition, or for setting parameter values such as a lower bound, an upper bound or a frequency step in the overall frequency range of the subsequently-sent probe signal or other parameters that will become evident from the below description.

Probe Signal Generation

In the example device of FIG. 3, the modulation signals are generated by a plurality of numerically-controlled oscillators (NCO) in an oscillator unit 11. Alternatively, the NCO could be replaced by an inverse discrete Fourier transform (IDFT), which would substitute components 11, 12 and 13.

As inputs, the NCO receives frequencies $\omega_n$, frequency offsets $\theta_n$ and initial phase shifts $\alpha_n$ with n=1, 2, . . . , N, wherein N is the number of modulation signals and thus the number of subcarrier signals in each probe signal, e.g. 10. The modulation frequencies $\omega_n$ may be in a range between 40 and 80 MHz with a frequency step of 4 MHz between neighboring modulation frequencies. The oscillator unit 11 typically generates digital modulation signals of the form $\exp(i((\omega_n+\theta_n)t)+\alpha_n)$, i.e. sine and/or cosine signals. Alternatively, the discrete values or the sums of the discrete values of the modulation signals may be pre-calculated and stored in a table of an internal memory of the device, if the modulation signals are not changed during a data acquisition.

Advantageously, the initial phase shifts $\alpha_n$ are non-zero and differ for at least some, in particular all, different n. This has the advantage that a ratio of maximum probe signal amplitude to average probe signal amplitude over time may be kept low. Thus, a transmitting power of the device may be kept low, while maintaining a high signal-to-noise ratio and low intermodulation.

It has been found that a feasible choice for the initial phase shifts $\alpha_n$ may be obtained by randomly generating $\alpha_n$ in the interval 0 to $2\pi$. For a given N, random numbers $\alpha_n$ may generated and the above criterion of low maximum amplitude may be checked before-hand. Then, the values of $\alpha_n$ may be stored as a table in the internal memory of the device and used for generating the probe signals.

Similarly, the modulation frequencies $\omega_n$ may be offset by frequency offsets $\theta_n$. Applying different $\theta_n$ to different frequencies $\omega_n$ may reduce an overall cycle time, i.e. an overall periodicity, of the probe signal in the case of a constant frequency step $\Delta\omega$ between neighboring modulation frequencies. However, the frequency offsets $\theta_n$ should not be too large, e.g. be bounded by an interval $(-0.5,+0.5)\times\Delta\omega$ in order not to overlap with a neighboring modulation frequency. In particular, the frequency offset may be 400 kHz in order to maintain the orthogonality criterion as defined earlier. In particular, all frequency offsets $\theta_n$ may be the same, $\theta_n=\theta$.

Advantageously, the frequency offset $\theta_n$ is the same for all modulation signals in one probe signal. Further advantageously, the frequency offset $\theta_n$ is the same for all probe signals in one cycle. Different $\theta_n$ may be applied to different cycles to reduce an overall cycle time.

In general, the input values for the probe signal generation concerning modulation frequencies $\omega_n$, frequency offsets $\theta_n$ and initial phase shifts $\alpha_n$ need to be stored, at least temporarily, or known, in order to subsequently process the echo signal, in particular in digital mixer 41.

In a next step, a switch matrix 12 is applied to the digital modulation signals. Applying the switch matrix 12 may switch off modulation signals of a certain modulation frequency. This may be useful for reducing the number of subcarrier signals in certain probe signals of a sweep, e.g. from N=10 to 5 or only 1 subcarrier signals per probe signal, while maintaining the number of subcarrier signals in other probe signals of the same sweep at N. In this way, the peak power may be lowered. Also, less processing power is required, and less data needs to be transmitted in the end, e.g. by the communication unit 49, e.g. a WiFi unit after serializer 42. For example, it may be useful to use a frequency step of $\Delta\omega$=4 MHz for low-frequency probe signals, e.g. between 40 and 1500 MHz, and a frequency step of $\Delta\omega$=8 MHz for higher-frequency probe signals, e.g. above 1500 MHz. In this case, the switch matrix 12 zeroes every second modulation signals when providing modulation signals for a probe signal above 1500 MHz.

Then, a band combiner 13 performs a summation of all digital modulation signals. Subsequently, a dynamic amplitude correction 14 may be performed on the combined signal that has been described above.

Further, a gating 15 is applied to the combined signal, still in the digital domain. The gating advantageously applies a smooth time window function in to the combined signal. The time window may e.g. be a Gaussian function, and it reduces artifacts which typically arise from applying hard windows such as an abrupt switching on or off of a signal.

Now, the combined modulation signals are converted to the analog domain by DAC 20, which receives a clock signal with a clock frequency from clock oscillator 21. In the example device of FIG. 3, the clock frequency is 200 MHz, leading to an analog signal that is then bandpass filtered by filter 22 with a frequency range of 120 to 160 MHz.

Then, the signal is mixed with a first carrier signal of a first carrier frequency generated by analog oscillator 23. The mixing, in this case an upconversion, is performed by means of analog mixer 24. This process of mixing is also called "heterodyning", wherein in particular only the "upper heterodynes", i.e. at a frequency equal to the sum of first carrier frequency and modulation frequencies, are used, whereas the "lower heterodynes", i.e. at a frequency equal to the difference between first carrier frequency and modulation frequencies, are discarded, e.g. filtered out. In general, mixing a signal towards higher frequencies is called "upconversion", whereas mixing a signal towards lower frequencies is called "downconversion".

In the example device, the first carrier frequency is 3600 MHZ, leading to a first mixed signal that is then bandpass filter by filter 25 in a frequency range of 3720 to 3760 MHz. The first mixed signal is then down-converted with analog mixer 27. For that purpose, the analog mixer 27 receives a second carrier signal from analog oscillator 26. The analog oscillator 26 is a variable-frequency oscillator configured to generate a second carrier signal with a second carrier frequency between 3800 and 7200 MHz. The oscillator 26 is advantageously controlled by the control unit 48. In particular, the second carrier frequency is changed between subsequent probe signals in steps of 40 MHz, i.e. the bandwidth of one probe signal, overall from 3800 to 7200 MHz. This leads to a second mixed signal. The second mixed signal in particular has a bandwidth of 40 MHz and comprises subcarrier frequencies with $\Delta\omega$=4 MHz. Subsequent second mixed signals of a sweep are lowpass filtered by filter 28. Filter 28 advantageously has a cutoff frequency of 3440 MHz. The filtered second mixed signals, which make up the actual probe signal, accordingly have frequencies in a frequency range between 40 and 3440 MHz. The probe signal is then transmitted by the transmitting antenna 29.

As an alternative to the example device, the mixing, i.e. modulation, of the analog modulation signals to the probe signal may be performed by means of one analog mixer only. Such upconversion in one step requires more filtering since harmonics need to be removed from the signal. In contrast, in the example device of FIG. 3, "mirror frequencies", e.g. upper heterodynes, are automatically discarded by applying several mixing steps sequentially.

Echo Signal Processing

The echo from the subsurface structure is received by receiving antenna 30 as analog echo signal and filtered by lowpass filter 32, in particular in the frequency range of the probe signal, in particular with a cutoff frequency of 3440 MHz.

The further processing of the echo signal in the analog processing unit 2 is mirrored from the probe signal generation as described above. In general, the probe signal is down-converted to the frequency range of the modulation signals, in particular to the range of 40 to 80 MHz. This may be done in one step or, as in the example device of FIG. 3, in several steps.

In the example device, the echo signal is mixed, in particular frequency translated, with the second carrier signal from the second analog oscillator 26 by means of mixer 33. This implies an upconversion of the echo signal to a first mixed echo signal that is then filtered by bandpass filter 34 in a frequency range between 3720 and 3760 MHz. The first mixed echo signal is then down-converted by mixing it with the first carrier signal from the first oscillator 23 by means of mixer 35. A resulting second mixed echo signal is filtered by bandpass filter 36 in a frequency range between 120 and 160 MHz. The second mixed echo signal is then converted to the digital domain by ADC 37, which receives the clock signal with the clock frequency from clock oscillator 21.

In the digital processing unit 1, a weighting 40 in time is applied to the echo signal. In particular, this is used to reduce the spectral leakage of the subsequent discrete Fourier transform (DFT). Then, the echo signal is input into digital mixer 41, wherein advantageously the echo signal is transformed to the frequency domain, e.g. by applying a DFT. The different spectral components, e.g. 10 if N=10, of the echo signal corresponding to the frequencies of the modulation signals are separated and corrected for the initial phase shifts &n.

Further, an offset or mean in each spectral component may be removed. The mean after the mixing stage is to reduce the signal to one complex coefficient for each band. It also defines the equivalent noise bandwith (ENBW) of the system given by the duration of the received signal and the shape of gating 15 and weighting 40.

In order to obtain a processed echo signal which is comparable to an echo signal of conventional, i.e. non-multiplexed, SFCW methods, the different spectral components need to be "serialized", i.e. put in sequence in time. This is done by serialization 42, e.g. by applying a delay matrix that comprises a time shift $\Delta t_n$ for each of the N spectral components. As a result of serialization 42, the echo signal has the form of a sweep of consecutive signals, wherein each subsequent signal only consists of one spectral component and differs in frequency from the previous signal by the frequency step $\Delta\omega$.

The further processing of the echo signal advantageously comprises correcting the echo signal for a device response, i.e. a correction of changes in amplitude and/or phase that are due to components of the device. For this reason, a calibration signal 31 may be measured between the transmitting antenna 29 and the receiving antenna 30, e.g. before each sweep of probe signals. The calibration signal 31 may be used to correct the echo signal in a calibration 43. In particular, a drift in the signal or the device response over time may be corrected by using a present calibration signal 31 as well as a historic calibration signal, which may e.g. be recorded by a manufacturer of the device.

Further, spatial averaging 44 may be applied to the echo signal. The spatial averaging increases the signal-to-noise ratio it reduces the amount of data. Since the echo signal will be stored or transmitted, e.g. by the communication unit 49, spatial averaging 44 is advantageously applied before transmission of the data.

It is common practice to apply further signal processing steps to the echo signal, such as at least one of weighting 45, zero padding 46 and an inverse Fourier transform 47. These steps are advantageously performed on a remote computing device. As a result of the inverse Fourier transform 47, the echo signal is converted to a time-domain waveform, which in the context of GPR is also known as A-scan.

In general, it is advantageous to use dedicated hardware not only for the analog processing unit 2 but also for the digital processing unit 1. The latter advantageously is one or more field programmable gate array (FPGA) configured to perform one or more of the described processing steps. The use of an FPGA facilitates efficient probe signal generation and/or echo signal processing, in particular real-time processing.

While there are shown and described presently preferred embodiments of the invention, it is to be distinctly understood that the invention is not limited thereto but may be otherwise variously embodied and practiced within the scope of the following claims.

The invention claimed is:

1. A method for probing a subsurface structure comprising:

sending an electromagnetic wave into the subsurface structure, receiving an echo of the electromagnetic wave from the subsurface structure, processing the echo for deriving an internal feature of the subsurface structure, wherein the sending the electromagnetic wave into the subsurface structure comprises subsequently sending a plurality of electromagnetic probe signals with differing frequency spectra into the subsurface structure, wherein each probe signal comprises at least two non-zero spectral components having a non-zero initial phase shift, where the non-zero initial phase shift of the at least two spectral components is such that a maximum amplitude of the probe signal is smaller than a maximum amplitude of a hypothetic probe signal with same spectral components but zero initial phase shift of the spectral components, wherein the receiving the echo comprises receiving an echo signal for each probe signal, and wherein the processing the echo comprises determining at least one amplitude and phase for each echo signal, and identifying at least one of a location and/or existence of the subsurface structure or a location and/or existence of a boundary within the subsurface structure from the processed echo.

2. The method of claim 1, wherein the spectral components are concurrent subcarrier signals with differing subcarrier frequencies.

3. The method of claim 1, wherein the spectral components are located in non-overlapping frequency bands.

4. The method of claim 1, wherein the at least two spectral components are orthogonal to each other, in particular wherein neighboring subcarrier frequencies differ from each other by a subcarrier spacing, and in particular wherein the subcarrier spacing fulfills an orthogonality condition, and/or in particular wherein the subcarrier spacing is between 1 and 20 MHz, in particular 4 MHz.

5. The method of claim 1, wherein the frequency spectra of the probe signals are located between 10 and 8000 MHz, in particular between 40 and 3440 MHz.

6. The method of claim 1, wherein an overall frequency spectrum of the plurality of subsequently sent probe signals has a width of at least 500 MHz, in particular at least 1000 MHz, more particularly at least 2000 MHz.

7. The method of claim 1, wherein the initial phase shift of the at least two spectral components is such that the maximum amplitude of the probe signal is smaller by at least 10%, at least 25% or at least 50% than the maximum amplitude of the hypothetic probe signal with the same spectral components but zero initial phase shift of the spectral components.

8. The method of claim 1, wherein each probe signal comprises between 3 and 20, in particular between 5 and 15, in particular 10, non-zero spectral components.

9. The method of claim 1, additionally comprising generating the probe signals by frequency translating at least two modulation signals of differing modulation frequencies with at least one carrier signal, in particular wherein the generating the probe signal includes changing a carrier frequency of the carrier signal between subsequent probe signals, and/or in particular wherein the modulation frequencies are the same for all probe signals.

10. The method of claim 9, wherein the generating the probe signals comprises generating at least two digital modulation signals, in particular wherein the generating the probe signals comprises generating at least one analog carrier signal.

11. The method of claim 10, wherein the at least two of the digital modulation signals have a non-zero initial phase shift.

12. The method of claim 9, wherein the modulation frequencies are below 100 MHZ, in particular wherein the modulation frequencies are in a range between 40 and 80 MHz, and/or in particular wherein the modulation frequencies differ by the subcarrier spacing.

13. The method of claim 9, wherein a carrier frequency of the carrier signal is at least 100 MHz.

14. The method of claim 10, wherein the generating the probe signals comprises obtaining at least two analog modulation signals by digital-to-analog converting the at least two digital modulation signals, and mixing the at least two analog modulation signals with at least one mixing signal from at least one analog oscillator by at least one analog mixer, in particular wherein the generating the probe signals comprises sequentially mixing the analog modulation signals with mixing signals from a plurality of analog oscillators by a plurality of analog mixers, and/or in particular wherein the generating the probe signals comprises applying upconversion to the analog modulation signals, and in particular upconversion and subsequent downconversion.

15. The method of claim 10, wherein the generating the digital modulation signals comprises switching off defined modulation signals.

16. The method of claim 1, wherein a first of the probe signals comprises a different number of non-zero spectral components than a second of the probe signals.

17. The method of claim 1, wherein an overall duration of each probe signal does not exceed 2 μs.

18. The method of claim 1, wherein an envelope to each probe signal has a rise time and a fall time of non-zero duration, in particular wherein the envelope is shaped as a Gaussian function.

19. The method of claim 1, wherein the sending the electromagnetic wave into the structure is performed by an antenna, in particular by a higher-frequency subantenna and a lower-frequency subantenna.

20. The method of claim 14, wherein the processing the echo signal comprises obtaining a mixed echo signal by mixing the echo signal with the at least one mixing signal from the at least one analog oscillator by at least one analog mixer, in particular wherein the processing the echo signal comprises sequentially mixing the echo signal with the mixing signals from the plurality of analog oscillators by a plurality of analog mixers, and/or in particular wherein the processing the echo signal comprises applying downconversion to the echo signal, in particular upconversion and subsequent downconversion.

21. The method of claim 20, wherein the processing the echo signal comprises analog-to-digital converting the mixed echo signal to a digital echo signal.

22. The method of claim 1, wherein the processing the echo signal comprises correcting the digital echo signal for the initial phase shift of the at least two spectral components.

23. The method of claim 1, wherein the processing the echo signal comprises obtaining a serialized echo signal by serializing the at least two non-zero spectral components, in particular using the digital echo signal.

24. The method of claim 1, wherein the processing the echo comprises deriving at least one property of the subsurface structure from a difference in amplitude and/or a difference in phase between the echo signal and the probe signal.

25. A device for probing a subsurface structure comprising an antenna, a probe signal generator for generating the electromagnetic probe signals to be sent into the subsurface structure by the antenna, an echo signal processor for processing the echo signals received from the subsurface structure by the antenna, and a control unit for controlling the probe signal generator and the echo signal processor, wherein the device is configured to carry out the method of claim 1.

26. The device of claim 25 comprising a first antenna configured to send the probe signals into the subsurface structure, and a second antenna configured to receive the echo signals received from the subsurface structure, in particular wherein the first antenna and the second antenna both comprise a lower-frequency subantenna and a higher-frequency subantenna.

27. The device of claim 25, wherein the probe signal generator comprises a digital signal generator configured to generate at least two digital modulation signals, a digital-to-analog converter configured to convert the digital modulations signals to analog modulation signals, at least one analog signal generator configured to generate at least one carrier signal, and at least one analog mixer configured to generate the probe signal by mixing the at least two analog modulation signals with the at least one carrier signal.

28. The device of claim 27, wherein the echo signal processor comprises at least one further analog mixer configured to generate a mixed echo signal by mixing the echo signal with the at least one carrier signal from the at least one analog signal generator, an analog-to-digital converter configured to convert the mixed echo signal to a digital echo signal, and a digital processor configured to derive the at least two non-zero spectral components from the digital echo signal.

\* \* \* \* \*